E. T. ROBINSON.
CLUTCH AND SHIFTING MECHANISM THEREFOR.
APPLICATION FILED DEC. 30, 1910.
1,008,069.
Patented Nov. 7, 1911.
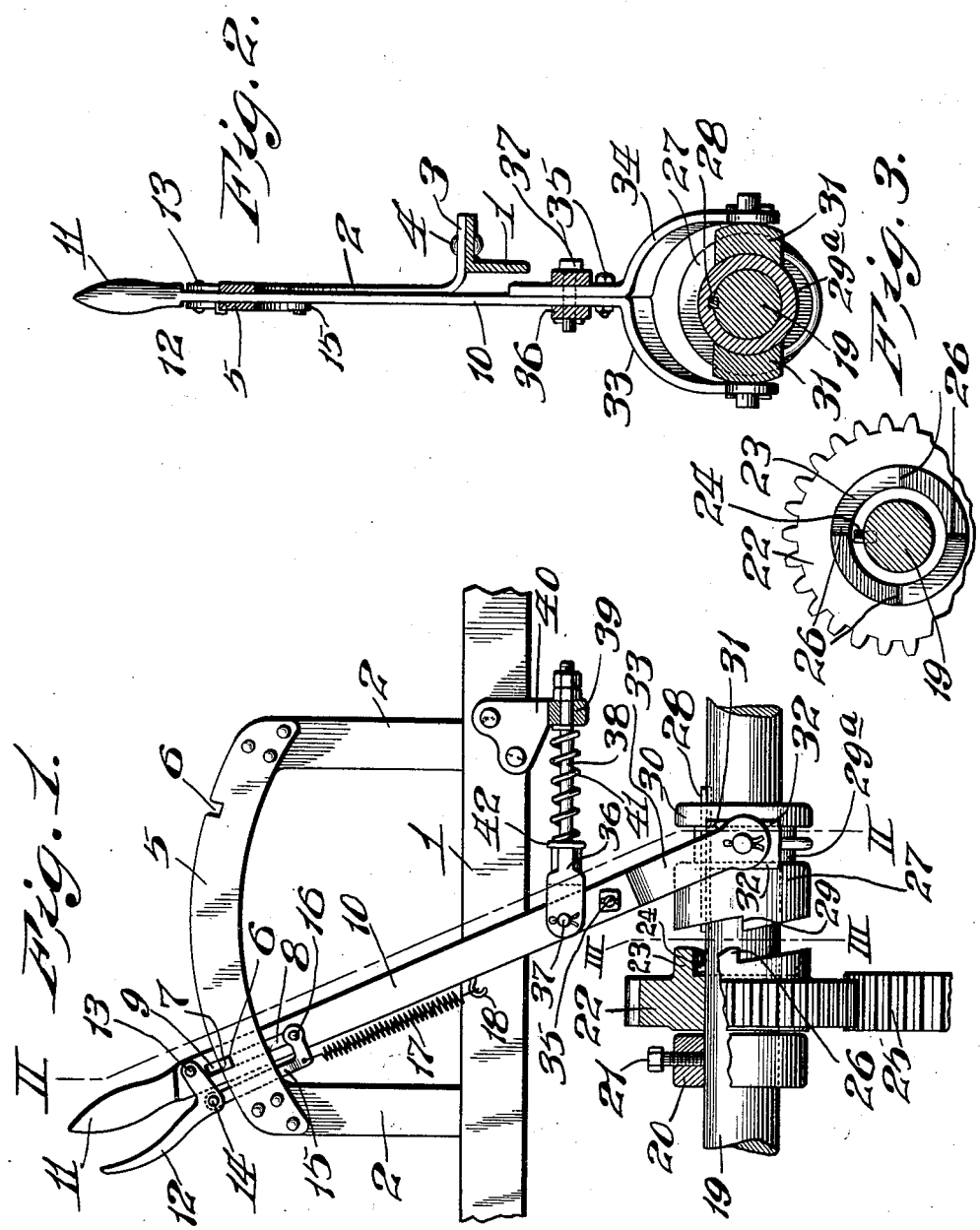

UNITED STATES PATENT OFFICE.

EARLE T. ROBINSON, OF UNIVERSITY, MISSOURI, ASSIGNOR TO ROBINSON FIRE APPARATUS MANUFACTURING COMPANY, OF ST. LOUIS, MISSOURI, A CORPORATION OF MISSOURI.

CLUTCH AND SHIFTING MECHANISM THEREFOR.

1,008,069. Specification of Letters Patent. Patented Nov. 7, 1911.

Application filed December 30, 1910. Serial No. 600,020.

*To all whom it may concern:*

Be it known that I, EARLE T. ROBINSON, a citizen of the United States, residing in the city of University, county of St. Louis, State of Missouri, have invented certain new and useful Improvements in Clutches and Shifting Mechanisms Therefor, of which the following is a specification.

This invention relates to clutches and shifting mechanisms for the same and has for its primary object to provide an improved construction, combination and arrangement of parts in devices of this character whereby they can be simply and durably constructed and rendered positive and efficient in action.

One of the objects of the present invention is to provide improved means for resiliently pressing the clutch members together, said means being adapted to compensate the wear on the clutch members to insure a positive clutching action whenever the shifting mechanism is thrown into "on" position.

Another object is to provide a clutch shifting lever having an improved automatically adjustable fulcrum and a resilient abutment for said fulcrum.

Other and further objects will appear in the specification and be specifically pointed out in the appended claims, reference being had to the accompanying drawings exemplifying the invention and in which, Figure 1 is a side elevation of a clutch and shifting mechanism therefor constructed in accordance with the principles of my invention, parts being shown in section. Fig. 2 is a section on the line II—II of Fig. 1. Fig. 3 is a section on the line III—III of Fig. 1.

Referring more particularly to the drawings and to the embodiment of the invention shown therein, portions of a rigid frame or support are shown in the form of an angle bar 1 upon which are mounted a pair of uprights 2, each of said uprights being preferably provided with a laterally projecting foot 3 by means of which it is secured to the angle iron 1 by means of a rivet 4. The upper ends of the uprights 2 have rigidly secured thereto in any suitable manner a sector bar 5 provided adjacent to either upright with a notch 6 within which a lug 7 projecting from a locking bolt 8 is adapted to be seated as shown on the left of Fig. 1. Said locking bolt 8 is slidably mounted in a slot 9 formed in the upper end of a shifting lever 10 adjacent the handle 11 of said lever. A hand-grip lever 12 which is pivotally mounted at 13 on the shifting lever 10 is pivotally connected at 14 with a connecting L-link 15 whose lower end is pivotally connected at 16 with the slide bolt 8. A helical spring 17 connected at one end to a hook 18 and at its other end to the link 15 tends to hold the link 15 in its lower position. When, however, it is desired to throw the shifting lever 10 into clutch operating position, the hand grip 12 is pressed to the handle 11 to remove the lug 7 from the notch in the left hand sector bar when the shifting lever may be moved into right hand position in which the clutch members will be thrown into engagement.

In the clutching device shown in the drawings, a power shaft 19 has rigidly connected thereto a collar 20 by means of a set screw 21. Said collar 20 provides a lateral abutment for a spur gear 22 which is freely rotatable on the shaft 19 and is provided with an overhanging flange 23 between which and the shaft 19 is an annular space within which is disposed a stop pin 24 carried by the shaft 19. Said stop pin 24 retains the spur gear 22 against an axial shifting movement along the shaft 19. In the present embodiment, the gear 22 is designed to transmit power to a second spur gear 25. In order to adapt the spur gear 22 as one of a pair of relatively movable clutch members, the overhanging annular flange 23 is provided on its lateral end face with a plurality of ratchet teeth 26. A second clutch member 27, which is held against rotation relatively to the shaft 19 by means of a spline 28 while at the same time being permitted to slide axially along said shaft, is provided with a plurality of complementary ratchet teeth 29 which, when the clutching element 27 is moved to the left, as shown in Fig. 1, interlock with the ratchet teeth 26 on the gear 22. In order to adapt the clutch member 27 to be suitably connected to the lower end of the shifting lever 10, said clutch member is provided with a reduced neck 29ª, adjacent its outer end which leaves a cylindrical shoulder 30. Within the groove thus formed, a pair of clutch shifting shoes 31 are slidably mounted, said shoes being of larger diameter across their outside surfaces than the clutch element 27 and provided with shoulders 32 overhanging the body portion and the collar 30 of the clutch element 27.

In order to provide the fork on the lower end of the shifting lever 10, said lever is preferably constructed of an integral bar with its lower end 33 provided with a circular offset, as shown in Fig. 2, the other arm of the fork being provided with a circularly bent bar 34, which is secured to the integral bar 10 by means of a bolt 35.

Referring now to Fig. 1, an adjustable fulcrum for the shifting lever 10 is provided in the form of a bifurcated support 36 within the arms of which the lever 10 is pivotally mounted at 37. Said support 36 is provided with a stem 38 which slides in an aperture in the depending end 39 of a bracket 40 rigidly mounted upon the angle bar 1. In order to provide resilient means for pressing the relatively movable clutch members together, the fulcrum 36 is made automatically adjustable by means of a helical spring 41 which is interposed between a collar 42 on the fulcrum 36 and the boss 39 forming said depending end of the bracket 40.

The operation of my device will now be readily understood and briefly stated is as follows. When the parts are in the position shown in Fig. 1, the power shaft 19 is running without delivering power to the gear 22. If now the shifting lever 10 be moved to the right, the resiliently mounted fulcrum 36 being nearer the forked lower end of the lever, the spring 41 will be compressed by said shifting movement so as to force the clutch member 27 resiliently against the other clutch member. It will thus be seen that the resilient force of the spring 41 is greatest when the clutch elements are in clutching position. In this position, of the parts, therefore, the fulcrum will automatically take up any wear that may occur between the parts and thus insure an efficient clutching action. Furthermore, when the shifting lever 10 is moved to the right, the spring 41 is compressed and immediately thereafter reacts to cause the lower portion of the movement of the clutch member 27 to take place with a gradually accelerated movement.

What I claim is:

1. The combination with a pair of relatively movable clutch members, of resiliently mounted means for effecting relative movement therebetween.

2. In a device of the character described, the combination with a fixed clutch element and a movable clutch element, of a shifting lever operatably connected to said movable clutch element, and a resiliently mounted fulcrum for said shifting lever.

3. In a device of the character described, the combination with a fixed support, of a fulcrum resiliently mounted on said support, a shifting lever pivotally mounted on said fulcrum intermediately of its ends, a fixed clutch element, and a movable clutch element, and means operatably connecting said shifting lever with said movable clutch element.

4. In a device of the character described, the combination with a power shaft, of fixed and movable clutch elements mounted on said power shaft, a shifting lever operatably engaging said movable clutch element at one end, means for locking the other end of said shifting lever in on and off position, and a resiliently mounted fulcrum for said lever disposed intermediately of the ends of said lever, said fulcrum being nearer to the movable clutch element than it is to the locking means at the other end of said shifting lever.

EARLE T. ROBINSON.

In the presence of—
J. B. MEGOWN,
M. C. HAMMON.

---

Copies of this patent may be obtained for five cents each, by addressing the "Commissioner of Patents, Washington, D. C."